United States Patent [19]

Ive

[11] Patent Number: 4,522,954

[45] Date of Patent: Jun. 11, 1985

[54] METHOD FOR PRODUCING A LOW DENSITY FOAMED POLYESTER RESIN

[76] Inventor: Frank Ive, 1862 Ives Ave., Kent, Wash. 98031

[21] Appl. No.: 589,040

[22] Filed: Mar. 14, 1984

Related U.S. Application Data

[63] Continuation of Ser. No. 475,052, Mar. 14, 1983.

[51] Int. Cl.$^3$ ................................................ C08J 9/14
[52] U.S. Cl. ........................................ 521/78; 521/79; 521/81; 521/121; 521/131; 521/138; 521/182
[58] Field of Search ............... 521/182, 138, 121, 131, 521/79, 78, 81

[56] References Cited

U.S. PATENT DOCUMENTS 3,362,919  1/1968  Rood ................................. 521/138
4,327,196  4/1982  West ................................. 521/138

*Primary Examiner*—Morton Foelak
*Attorney, Agent, or Firm*—Christensen, O'Connor, Johnson & Kindness

[57] ABSTRACT

A method for producing low density polyester foam includes heating the resin to a temperature in the range of from 80° to 140° F., combining the resin with a blowing agent such as a sulfonyl hydrazide, combining the resulting admixture with a catalyst, and depositing the catalyzed resin on a surface. The density of the resulting foam can be decreased by incorporating a flourinated hydrocarbon into the resin.

24 Claims, 1 Drawing Figure

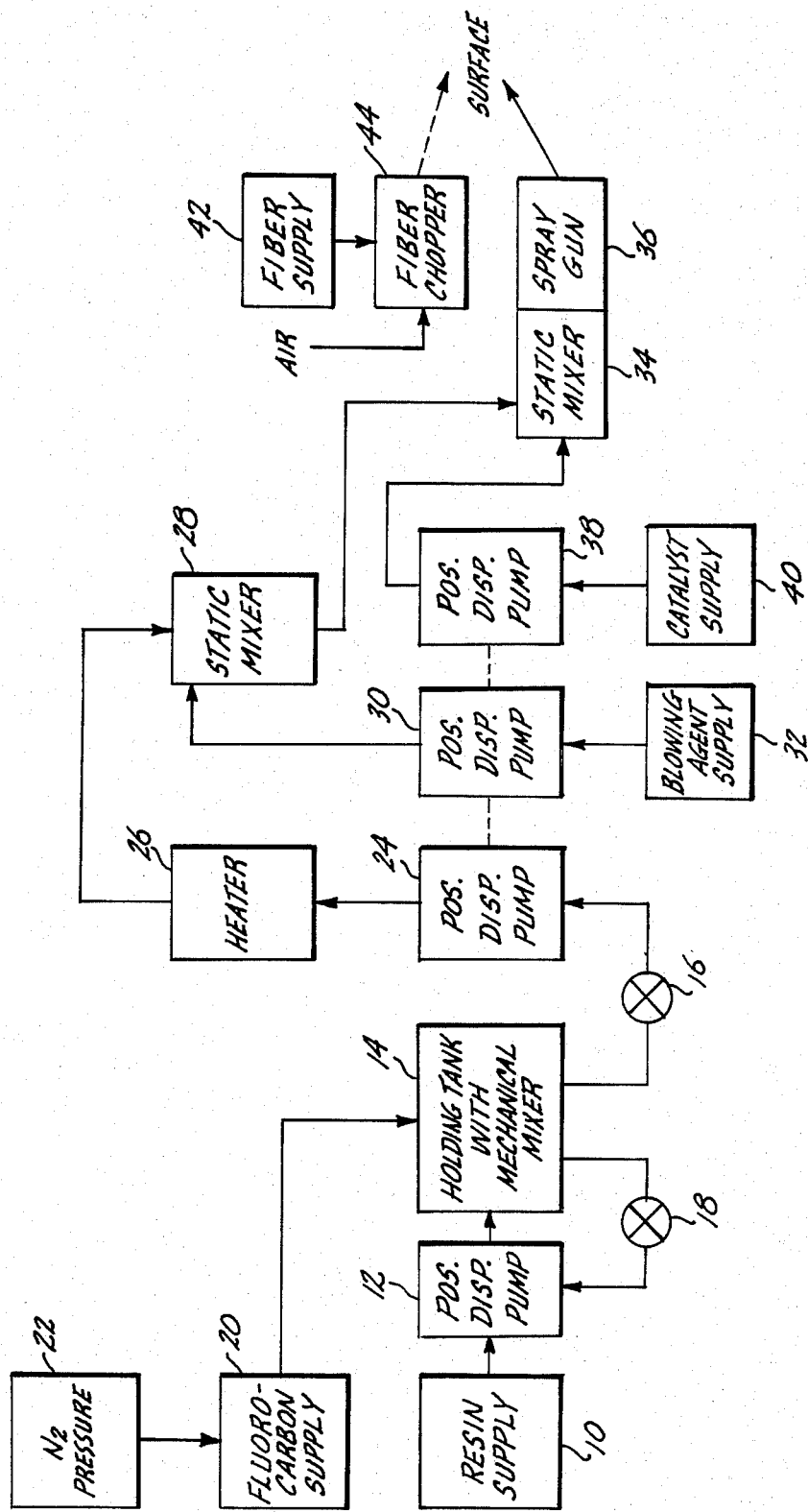

1

METHOD FOR PRODUCING A LOW DENSITY FOAMED POLYESTER RESIN

This application is a continuation application based on prior copending application Ser. No. 475,052, filed Mar. 14, 1983, method for producing a low density foamed polyester resin.

BACKGROUND OF THE INVENTION

The present invention relates to a method and apparatus for making a low density foam from a polyester resin and more particularly to a method and apparatus for depositing an uncured polyester resin onto a surface to form a foamed polyester resin article.

Techniques have been available for producing polyester resin foams. While the prior techniques purport to produce low density foams, the techniques have only been successful in producing foams having a density of greater than twenty-four pounds per cubic foot. Additionally, these prior techniques are successful in making such foams only on a substantially horizontal surface or in a mold. Examples of such polyester resin foams are those disclosed in three patents to Jacobs et al., U.S. Pat. Nos. 3,920,589, 3,920,590, and 3,920,591. These foam compositions have, however, led to limited commercial interest because of their high cost and impracticality. Moreover, attempts to spray these foams onto a surface or place them into a mold have not always been successful.

Recent advances have been made in connection with low density polyester resin foam utilizing a sulfonyl hydrazide blowing agent in conjunction with promoters, surfactants and other materials. Such foamed resins are disclosed in West et al., U.S. Pat. No. 4,327,196. Attempts to spray even these improved resin foams have also met with limited success, especially when attempts have been made to spray the resin foam with or without glass fiber reinforcement onto a surface that has a vertical component.

SUMMARY OF THE INVENTION

The present invention advances the state of the art by providing methods and apparatus for depositing polyester resins onto a surface to produce foam articles and particularly to produce layers of foam of finite thickness not only on a horizontal mold or mandrel but also on surfaces that have a vertical component and in a mold or on a mandrel. In one of its broadest aspects, the method for making a low density foam from a polyester resin comprises the steps of (a) metering a predetermined amount of a polyester resin from a storage zone to a heating zone, (b) heating the resin to a temperature in the range of from 80° F. to 140° F. in the heating zone, (c) forwarding the heated resin to a first mixing zone, (d) metering a minor amount of a blowing agent to the first mixing zone and mixing the blowing agent with the polyester resin to form an activated resin, (e) forwarding the activated resin to a second mixing zone, (f) metering a minor amount of a catalyst to the second mixing zone and mixing the catalyst with the activated resin to form a catalyzed resin, and (g) immediately thereafter depositing the catalyzed resin on a surface. Preferably a minor amount of a fluorinated hydrocarbon is intermixed with the resin prior to introducing the catalyst into the resin. The blowing agent can comprise sulfonyl hydrazides as well as other suitable materials.

BRIEF DESCRIPTION OF THE DRAWING

A better understanding of the present invention can be derived by reading the ensuing specification in conjunction with the accompanying drawing wherein the FIGURE is a flow chart illustrating the method of the present invention by which low density polyester resin foams are produced.

DETAILED DESCRIPTION OF THE INVENTION

Referring to the FIGURE, liquid ethylenically polyester resin is pumped from a storage tank 10 by a positive displacement pump 12 to a holding tank 14. As discussed in more detail below, the holding tank may be dispensed with depending upon the additives supplied with the original liquid resin. A mechanical mixer is provided in the holding tank 14 for the purpose of mixing additives with the resin. A recirculation conduit leads from the bottom of the tank through a recirculation valve 18 and back to the pump 12. A primary outlet conduit leads to an outlet valve 16. If desired, the outlet valve 16 can be closed while the recirculation valve 18 is opened. In this manner, the material from the holding tank can be recirculated by the pump 12 from the bottom to the top of the tank to facilitate uniform distribution of additives throughout the resin. Any of a variety of conventional mechanical mixers can be effectively employed in the holding tank.

A fluorocarbon gassing agent can be mixed with the resin in the holding tank 14. Fluorocarbon can be stored in a supply container 20, which is pressurized from an inert gas pressure source, such as a nitrogen pressure bottle 22. The inert gas pressure can be maintained in the range of from 55 to 75 psi, preferably at about 65 psi over the fluorocarbon supply. In this manner, the fluorocarbon can be supplied to the holding tank 14 under a pressure that prevents substantial vaporization of the fluorocarbon in the holding tank. Of course, the holding tank must be capable of withstanding ordinary pressures in excess of 75 psi. The holding tank is preferably also fitted with the appropriate pressure relief valves in the event an inordinate overpressure occurs Fluorocarbon containing resin is pumped by a second positive displacement pump 24 through the outlet valve 16 into labyrinth block heater 26. The heater 26 is preferably of relatively conventional design, employing electrical heating elements that heat an aluminum block defining a labyrinth through which the resin flows. In accordance with the present invention, it is critical that the resin be heated to within the range of 80° F. to 140° F. If the resin is heated higher than 140° F., the resin will prematurely cure, causing major equipment problems as well as causing a deleterious effect on the end product. On the other hand, the resin must be heated to at least 80° F. in order to achieve a relatively quick cure after the resin leaves the resin spray gun. A quick cure is necessary in order to prevent running or sagging of the foamed product on a surface having a vertical component. More preferably, the resin is heated to a heater outlet temperature of between 90° and 130° F.

Another perhaps more important reason for heating the resin is to reduce its viscosity so that the gassing and blowing agents can generate an amount of void sufficient to yield a low density foam. At the same time, care must be taken to retain sufficient resin viscosity and surface tension so that the bubbles or cells in the foam will not contract before the resin cures. Slowing the cell contraction rate is accomplished by providing for a higher viscosity resin that will not immediately contract during the short period of time between occurrence of maximum cell size and resin cure. The viscosity is maintained sufficiently high during this period by only heating the resin to within the temperature ranges set forth above and assuring that the resin cools relatively rapidly once it leaves the gun. The latter can be accomplished by not attempting to build a foam layer that is too thick, e.g., more than about 1 to 2 inches.

The same pump 24 that pumps the resin through the heater 26 also pumps the resin through a stationary mixer 28. A third positive displacement pump 30 meters a blowing agent from a supply tank 32 into the stationary mixer 28. The composition of the blowing agent will be described in greater detail below. A minor amount of the blowing agent is mixed with the heated resin in the stationary mixer. While a variety of stationary mixers are available, it has been found that a mixer described in U.S. Pat. No. 3,286,992, issued Nov. 22, 1966, expressly incorporated herein by reference and sold under the trademark "Static Mixer" by the Kenics Corporation of Danvers, Mass., provides exceptionally through mixing. Stationary mixer as utilized herein means a mixer or mixing system that has no moving parts, that can be placed in a liquid process line, that can be utilized on a continuous basis that is antifouling, but that utilizes very little space.

From the stationary mixer 28, the heated resin combined with the blowing agent is forwarded to a second stationary mixer 34 that is positioned immediately upstream of the spray gun 36. A fourth positive displacement pump 38 meters catalyst from a supply container 40 to the second stationary mixer 34. The heated resin containing the blowing agent must be thoroughly admixed with the catalyst and immediately is fed to the spray gun 36.

Mixing of the resin at this stage of the process is very crucial and somewhat difficult to achieve because of the relative amounts of the materials being mixed and the extreme difference in viscosities. First, very small amounts of catalyst must be thoroughly and uniformly mixed with the resin. Normally, weight ratios of resin to catalyst of from 50:1 to 100:1 are encountered. Moreover, the catalyst normally has a viscosity on the order of 10 cps., while the resin will have a viscosity when heated on the order of 700 to 900 cps. or higher.

It is presently preferred that a series of static-type mixers be employed to achieve the necessary mixing of the catalyst and resin. The preferred mixer first includes a static mixer of the type disclosed in U.S. Pat. No. 3,709,468, issued Jan. 9, 1973, and expressly incorporated herein by reference, into which both the catalyst and resin are introduced. The mixture from the first static mixer is introduced into a segment of a second static mixer of the Kenics type described above. The materials are mixed at pressures on the order of 700 to 1000 psi or greater in less than a second's time. This mixing system maintains turbulent flow and, thus, provides adequate mixing. The mixture is fed from the second static mixer through a conventional spray nozzle forming part of the gun on operator demand and directed toward a surface. Under these conditions, the catalyst and resin are sufficiently mixed prior to leaving the gun so that a uniform cure can be obtained in the foamed resin shortly after the resin is deposited on the surface.

When the operational parameters are maintained within the limits set forth above, and the compositions are maintained within the limits set forth herein, the polyester resin can be sprayed in accordance with the present invention onto horizontal, slanted or even vertical surfaces. The resin immediately foams upon leaving the gun and cures with little or no sagging or running. Thus, a relatively uniform layer of polyester resin foam can be applied, for example, to a glass reinforced resin substrate and sandwiched with another layer of reinforced resin to provide a foam sandwich that has a variety of end uses.

As an alternative to spraying, a low pressure nozzle or pour nozzle can be affixed to the gun. Instead of depositing the material onto a surface by spraying, the resin, mixed and heated in accordance with the present invention, can be deposited or poured into a mold directly from the gun. The resin again will immediately foam to expand and contact the mold surfaces and fill the mold.

If desired, the foam itself can be reinforced with glass fibers. Fiber reinforcement can be accomplished in a conventional manner similar to that employed in combining chopped glass fibers, for example, with conventional nonfoamed resin. Generally, glass fiber roving is taken from a roving supply 42 and advanced to a fiber chopper 44. The fiber chopper is generally physically attached to the resin spray gun 36. Conventional fiber choppers are generally air powered and include a set of rotating blades driven by an air motor. The blades chop the fiber into predetermined lengths and force the chopped fibers in a stream from the chopper into impinging with the resin spray emanating from the spray gun. The resin spray and fibers are thus simultaneously deposited on the surface on which the resin foam is to be formed. The fibers are thus distrubuted throughout the resin foam in a random manner, providing multidirectional reinforcement to the foam structure.

Polyester resins employed in accordance with the present invention to provide low density foams are liquid, unsaturated polyester resins that have a higher viscosity and a higher surface tension than conventional spraying resins. While it is difficult to precisely define high surface tension, resins with a viscosity of 700 to 1000 cps. are preferred while resins having viscosities up to 20,000 cps. can be made to work with the present system. These resins are blended with various ingredients including fluorocarbon gassing agents and specific blowing agents that are described in more detail below. Those resins specifically disclosed in West et al., U.S. Pat. No. 4,327,196, expressly incorporated herein by reference, are especially efficacious in producing the low density polyester foam resins in accordance with the present invention. As disclosed in West et al., in addition to the blowing agents the resins can contain promoters, surfactants, and fillers as well as a wide variety of other additives including flame retardants, stabilizers and the like. Fillers can also be added to the polyester resin either by the resin manufacturer or by the end user of the process disclosed herein by adding the fillers to the holding tank and mechanically admixing them with the resins.

The chemical blowing agents suitable for use in conjunction with the present invention include those disclosed by West et al. as mono-substituted sulfonyl hydrazides. A wide variety of sulfonyl hydrazides may be employed, however, those sold under the trademark "Celogen" by Uniroyal Chemical, a division of Uniroyal, Inc. of Naugatuck, Conn., or those available from Alpha Chemical of Collierville, Tenn. are preferred for use in conjunction with the present invention. Other non hydrazide agents, such as the azo foaming agent sold under the name Lucel 7 and the TBO acid based agent sold under the name Luperfoam 40 by Lucidol, Division of Pennwalt Corporation, are also satisfactory. The sulfonyl hydrazides can be supplied in the form of a liquid or powder. If the sulfonyl hydroazides are supplied in the form of a powder, a liquid carrier is needed to facilitate mixing with the heated resin. A suitable carrier is polyethylene glycol, which has a specific gravity similar to the sulfonyl hydrazides. The celogen is thoroughly mixed in suspension with the polyethylene glycol carrier in a weight ratio of from 1 to 2 to 1 to 1 hydrazide to polyethylene glycol. The blowing agent is preferably combined with the heated resin in a range of from 0.5 to 3.0 weight percent based on the amount of resin. It is most perffered that about 1.0 percent by weight of sulfonyl hydrazide be admixed with the heated resin.

It is important that the catalyst, normally methyl ethyl ketone peroxide be admixed with the heated resin in the spray gun immediately prior to spraying the mixture onto a surface, because the blowing agent and catalyst quickly interact to cause resin cure. In accordance with the present invention, the catalyst is admixed with the heated resin containing the blowing agent in amounts ranging from about 2.0 percent to about 5.0 percent by weight based on the resin. It is most preferred that about 3.0 percent by weight of catalyst be employed.

The fluorocarbon gassing agent is also critical to forming low density foams in accordance with the present invention. Any of a variety of conventional fluorocarbons can be utilized, for example, dichlorofluoromethane, trichlorofluoromethane, and trichlorotrifluoroethane. It is preferred that the fluorocarbon be combined with the polyester resin amounts ranging from about 1.0 percent to about 12 percent by weight based on the resin. It has been found that about 4.0 percent by weight fluorocarbon will provide a foam having a density on the order of from 15 to 25 pounds per cubic foot. Increasing the amount of the fluorocarbon will decrease the foam density. It has been possible to achieve polyester resin foam densities of on the order of about 4 to about 8 pounds per cubic foot in accordance with the present invention utilizing fluorocarbon amounts in the upper end of the foregoing range.

The fluorocarbons can be combined with the resin supplied from a manufacturer in the holding tank 14. If the fluorocarbon is injected into the holding tank immediately below the mixing element, adequate dispersion of the fluorocarbon throughout the resin can be achieved. It has also been found that the fluorocarbons can be admixed with the resin by the resin manufacturer prior to shipping, in amounts up to about 4 to 5 percent by weight while still maintaining a stable end product. Additional fluorocarbon can then be added as desired by the foam manufacturer. Alternatively, the fluorocarbon can be admixed with the resin in a stationary mixer or other suitable mixing system prior to admitting the resin to the heater. In this manner, the amount of fluorocarbon admixed with the resin can be varied as desired to alter the foam density during production.

In addition to the foregoing, it is most desirable to incorporate an emulsifying and thickening agent into the resin. The emulsifying and thickening agent can be introduced into the resin by the resin manufacturer or can be added by the end user by admixing the thickening agent with the resin in the holding tank. A most preferred emulsifying and thickening agent is a sintered colloidal silica. One suitable colloidal silica material is sold under the trademark Cab-O-Sil by the Cabot Corporation of Boston, Mass.

While the present invention has been described in conjunction with a preferred embodiment, one of ordinary skill after reading the foregoing specification will be able to effect various changes, substitutions of equivalents, and other alterations to the methods and composition set forth herein. It is therefore intended that the protection granted by Letters Patent hereon be limited only by the definition contained in the appended claims and equivalents thereof.

The embodiments of the invention in which an exclusive property or privilege is claimed are defined as follows:

1. A method for making a low density foam from a polyester resin comprising the steps of:
   metering a predetermined amount of a polyester resin from a storage zone to a heating zone,
   heating said resin to a temperature in the range of from 90° F. to 140° F. in said heating zone,
   forwarding said heated resin to a first mixing zone,
   metering a minor amount of a blowing agent to said first mixing zone and mixing said blowing agent with said polyester resin to form an activated resin,
   forwarding said activated resin to a second mixing zone,
   metering a minor amount of a catalyst to said second mixing zone and mixing said catalyst with said activated resin to form a catalyzed resin,
   immediately thereafter depositing said catalyzed resin on a surface to produce a substantially uniformly dense resin product.

2. The method of claim 1 further comprising:
   combining a minor amount of a fluorinated hydrocarbon with said resin prior to mixing a catalyst therewith.

3. The method of claim 2 wherein said hydrocarbon is selected from the group consisting of dichlorofluoromethane, trichlorofluoromethane, and trichlorotrifluoroethane.

4. The method of claim 3 wherein said fluorinated hydrocarbon is added in amounts ranging from about 1 percent to about 12 percent by weight based on said polyester resin.

5. The method of claim 4 wherein said fluorinated hydrocarbon is added in the amounts ranging from about 3 percent to about 5 percent by weight.

6. The method of claim 4 wherein said resin containing a fluorinated hydrocarbon is maintained under a pressure of from about 55 psi to about 75 psi.

7. The method of claim 1 wherein said polyester resin contains a minor amount of a fluorinated hydrocarbon.

8. The method of claim 7 wherein said fluorinated hydrocarbon is added in amounts ranging from about 1 percent to about 18 percent by weight based on said polyester resin.

9. The method of claim 8 wherein said fluorinated hydrocarbon is added in amounts ranging from about 3 percent to about 5 percent by weight.

10. The method of claim 1 wherein said blowing agent is added in amounts ranging from about 0.5 percent to about 3 percent by weight based on said polyester resin.

11. The method of claim 10 wherein said blowing agent is added in amounts ranging from about 1 percent to about 2 percent by weight.

12. The method of claim 4 wherein said blowing agent is added in amounts ranging from about 0.5 percent to about 3 percent by weight based on said polyester resin.

13. The method of claim 12 wherein said blowing agent is added in amounts ranging from about 1 percent to about 2 percent by weight.

14. The method of claim 1 wherein said resin is heated from about 90° F. to about 130° F. in said heating zone.

15. The method of claim 10 wherein said blowing agent comprises a particulate material in a liquid carrier.

16. The method of claim 15 wherein said blowing agent comprises a sulfonyl hydrazide.

17. The method of claim 16 wherein said sulfonyl hydrazide comprises a mono-substituted sulfonyl hydrazide.

18. The method of claim 16 wherein said carrier comprises a low molecular weight water-miscible polymer.

19. The method of claim 18 wherein said carrier comprises polyethyleneglycol.

20. The method of claim 19 wherein said blowing agent and said carrier are present in substantially equal amounts.

21. The method of claim 20 wherein said catalyst is metered to said mixing zone in amounts ranging from about 1 percent to about 3 percent by weight based on said polyester resin.

22. The method of claim 1 further comprising:
adding a thickening agent to said resin to thicken said catalyzed resin when sprayed and to cause said catalyzed resin to reset flowing before curing.

23. The method of claim 22 wherein said thickening agent comprises a colloidal silica.

24. The method of claim 1 wherein said resin is deposited by spraying onto a surface.

* * * * *

UNITED STATES PATENT AND TRADEMARK OFFICE
CERTIFICATE OF CORRECTION

PATENT NO. : 4,522,954
DATED : June 11, 1985
INVENTOR(S) : Frank E. Ives

It is certified that error appears in the above-identified patent and that said Letters Patent is hereby corrected as shown below:

Title Page, Item /76/, "Frank Ive" should read

-- Frank E. Ives --.

Signed and Sealed this

Twenty-sixth Day of November 1985

[SEAL]

Attest:

DONALD J. QUIGG

Attesting Officer     Commissioner of Patents and Trademarks